US010625414B2

(12) United States Patent
Haddadin et al.

(10) Patent No.: US 10,625,414 B2
(45) Date of Patent: Apr. 21, 2020

(54) ROBOTIC SYSTEM AND HOUSING PART FOR SUCH ROBOTIC SYSTEM

(71) Applicants: Sami Haddadin, Hannover (DE); KBEE AG, Munich (DE)

(72) Inventors: Sami Haddadin, Hannover (DE); Tim Rokahr, Munich (DE)

(73) Assignee: FRANKA EMIKA GmbH, Munich (DE)

( * ) Notice: Subject to any disclaimer, the term of this patent is extended or adjusted under 35 U.S.C. 154(b) by 49 days.

(21) Appl. No.: 15/752,574

(22) PCT Filed: Aug. 15, 2016

(86) PCT No.: PCT/EP2016/069339
§ 371 (c)(1),
(2) Date: Feb. 13, 2018

(87) PCT Pub. No.: WO2017/029263
PCT Pub. Date: Feb. 23, 2017

(65) Prior Publication Data
US 2018/0207795 A1 Jul. 26, 2018

(30) Foreign Application Priority Data

Aug. 14, 2015 (DE) .................. 10 2015 113 483
Oct. 8, 2015 (DE) .................. 10 2015 012 960

(51) Int. Cl.
*B25J 9/00* (2006.01)
*B25J 17/00* (2006.01)
(Continued)

(52) U.S. Cl.
CPC ............. *B25J 9/0009* (2013.01); *B25J 17/00* (2013.01); *B25J 18/00* (2013.01); *B25J 19/0075* (2013.01); *Y10S 901/28* (2013.01); *Y10S 901/49* (2013.01)

(58) Field of Classification Search
CPC . B25J 9/0009; B25J 17/00; B25J 18/00; B25J 19/0075; Y10S 901/28; Y10S 901/49
See application file for complete search history.

(56) References Cited

U.S. PATENT DOCUMENTS 4,025,838 A 5/1977 Watanabe
4,398,110 A 8/1983 Flinchbaugh et al.
(Continued)

FOREIGN PATENT DOCUMENTS

AT 509927 A2 12/2011
CA 2940490 A1 9/2015
(Continued)

OTHER PUBLICATIONS

International Search Report and Written Opinion for Application No. PCT/EP2017/059448 dated Aug. 1, 2017.
(Continued)

*Primary Examiner* — Adam D Rogers
(74) *Attorney, Agent, or Firm* — Wolf, Greenfield & Sacks, P.C.

(57) ABSTRACT

The present invention relates to a robotic system having at least one robot arm which consists of a plurality of members/limbs, which are connected with each other by joints, in which the housing is configured to transmit the torques and forces, which are introduced into the member, onto a member being adjacent thereto, and in which the housing is composed of at least two housing parts being complementary in shape, which housing parts are connected to each other in a manner allowing the transmission of torques and forces.

11 Claims, 4 Drawing Sheets

(51) Int. Cl.
B25J 18/00 (2006.01)
B25J 19/00 (2006.01)

(56) References Cited

U.S. PATENT DOCUMENTS

| | | | |
|---|---|---|---|
| 4,591,198 | A | 5/1986 | Monforte et al. |
| 4,659,971 | A | 4/1987 | Suzuki et al. |
| 4,678,952 | A | 7/1987 | Peterson et al. |
| 4,804,304 | A | 2/1989 | Tellden et al. |
| 5,360,249 | A | 11/1994 | Monforte et al. |
| 6,246,479 | B1 | 6/2001 | Jung et al. |
| 6,422,441 | B1 | 7/2002 | Settelmayer et al. |
| 6,463,360 | B1 | 10/2002 | Terada et al. |
| 8,059,088 | B2 | 11/2011 | Eid et al. |
| 8,226,140 | B1 | 7/2012 | Dietrich et al. |
| 8,423,189 | B2 | 4/2013 | Nakanishi et al. |
| 8,918,215 | B2 | 12/2014 | Bosscher et al. |
| 8,997,599 | B2 * | 4/2015 | Maisonnier .......... B25J 17/0275 74/490.03 |
| 10,279,478 | B2 | 5/2019 | Akan et al. |
| 2001/0038453 | A1 | 11/2001 | Jung et al. |
| 2001/0045808 | A1 * | 11/2001 | Hietmann ................ B25J 15/04 318/568.11 |
| 2005/0093821 | A1 | 5/2005 | Massie et al. |
| 2005/0285854 | A1 | 12/2005 | Morita et al. |
| 2006/0259195 | A1 | 11/2006 | Eliuk et al. |
| 2007/0057913 | A1 | 3/2007 | Eid et al. |
| 2008/0016979 | A1 | 1/2008 | Yasumura et al. |
| 2008/0252311 | A1 | 10/2008 | Koh et al. |
| 2009/0314120 | A1 | 12/2009 | Larsson et al. |
| 2010/0198394 | A1 | 8/2010 | Trygg |
| 2010/0212133 | A1 | 8/2010 | Montesanti et al. |
| 2010/0262288 | A1 | 10/2010 | Svensson et al. |
| 2010/0314895 | A1 | 12/2010 | Rizk et al. |
| 2011/0190932 | A1 | 8/2011 | Tsusaka et al. |
| 2012/0185099 | A1 | 7/2012 | Bosscher et al. |
| 2013/0151010 | A1 | 6/2013 | Kubota et al. |
| 2013/0255426 | A1 | 10/2013 | Kassow et al. |
| 2013/0273818 | A1 | 10/2013 | Guan et al. |
| 2014/0047940 | A1 * | 2/2014 | Yamamoto .............. B25J 17/00 74/490.05 |
| 2014/0183979 | A1 | 7/2014 | Pelrine et al. |
| 2014/0252668 | A1 | 9/2014 | Austin et al. |
| 2015/0053040 | A1 | 2/2015 | Ueda et al. |
| 2015/0122070 | A1 * | 5/2015 | Yamaguchi .......... B25J 19/0075 74/490.01 |
| 2017/0252920 | A1 * | 9/2017 | Motomura ............... B25J 9/102 |
| 2017/0320211 | A1 | 11/2017 | Akan et al. |
| 2018/0186017 | A1 * | 7/2018 | Xiong ...................... B25J 18/04 |
| 2018/0345505 | A1 | 12/2018 | Haddadin |
| 2018/0354141 | A1 | 12/2018 | Haddadin |
| 2018/0361594 | A1 | 12/2018 | Haddadin |
| 2019/0054634 | A1 | 2/2019 | Haddadin |
| 2019/0099879 | A1 | 4/2019 | Haddadin |
| 2019/0099881 | A1 * | 4/2019 | Niu ........................ B25J 9/0009 |
| 2019/0099903 | A1 * | 4/2019 | Goto ........................ B25J 19/06 |
| 2019/0126465 | A1 | 5/2019 | Haddadin |
| 2019/0126468 | A1 | 5/2019 | Haddadin |
| 2019/0134811 | A1 | 5/2019 | Haddadin |
| 2019/0168383 | A1 | 6/2019 | Haddadin |
| 2019/0315002 | A1 | 10/2019 | Haddadin |
| 2019/0275681 | A1 | 11/2019 | Bohme et al. |

FOREIGN PATENT DOCUMENTS

| | | |
|---|---|---|
| CN | 201437046 U | 4/2010 |
| CN | 102302858 A | 1/2012 |
| CN | 102410342 A | 4/2012 |
| CN | 104802156 A | 7/2015 |
| DE | 296 09 018 U1 | 8/1996 |
| DE | 197 31 656 C1 | 1/1999 |
| DE | 199 56 176 A1 | 10/2001 |
| DE | 699 21 721 T2 | 11/2005 |
| DE | 10 2005 054575 B3 | 4/2007 |
| DE | 10 2008 062622 A1 | 6/2010 |
| DE | 10 2009 039104 A1 | 3/2011 |
| DE | 10 2010 063 222 A1 | 6/2012 |
| DE | 10 2013 013679 A1 | 2/2014 |
| DE | 10 2013 109753 A1 | 3/2014 |
| DE | 10 2014 216514 B3 | 9/2015 |
| DE | 102016004788 A1 * | 10/2017 ............ B25J 19/007 |
| EP | 441397 A1 | 8/1991 |
| EP | 1435737 A1 | 7/2004 |
| EP | 1880809 A1 | 1/2008 |
| EP | 2129498 A1 | 12/2009 |
| EP | 2131257 A1 | 12/2009 |
| EP | 2548706 A1 | 1/2013 |
| EP | 2784612 A2 | 10/2014 |
| EP | 2851162 A2 | 3/2015 |
| EP | 2864085 A2 | 4/2015 |
| EP | 2868439 A1 | 5/2015 |
| JP | S60 123288 A | 7/1985 |
| JP | S61 252084 A | 11/1986 |
| JP | S62 87153 A | 4/1987 |
| JP | H08281580 A | 10/1996 |
| JP | 2000-218584 A | 8/2000 |
| JP | 2005-349510 A | 12/2005 |
| JP | 2008-23642 A | 2/2008 |
| KR | 2014-0011973 A | 1/2014 |
| WO | WO 2007/082954 A1 | 7/2007 |
| WO | WO 2007/099511 A2 | 9/2007 |
| WO | WO 2009/124904 A1 | 10/2009 |
| WO | WO 2010/088959 A1 | 8/2010 |
| WO | WO 2011/107143 A1 | 9/2011 |
| WO | WO 2014/162161 A1 | 10/2014 |
| WO | WO 2014/170355 A1 | 10/2014 |
| WO | WO 2015/113757 A1 | 8/2015 |

OTHER PUBLICATIONS

International Preliminary Report on Patentability for Application No. PCT/EP2017/059448 dated Oct. 23, 2018.
International Search Report and Written Opinion for Application No. PCT/EP2017/059446 dated Jul. 19, 2017.
International Preliminary Report on Patentability for Application No. PCT/EP2017/059446 dated Oct. 23, 2018.
International Search Report and Written Opinion for Application No. PCT/EP2017/059572 dated Jul. 27, 2017.
International Preliminary Report on Patentability for Application No. PCT/EP2017/059572 dated Oct. 30, 2018.
[No Author Listed], "Advanced Automation for Space Missions," NASA Conference Publication 2255, Aug. 29, 1980, pp. 1-335. Retrieved from https://ntrs/nasa/gov/archive/nasa/casi.ntrs.nasa.gov/19830007077.pdf on Jul. 7, 2017.
[No Author Listed], "FANUC," YouTube, Dec. 22, 2007. Retrieved from https://www.youtube.com/watch?v=-SREct28IJM on Jul. 11, 2017. Supplemented by five .PNG images taken from video.
[No Author Listed], CNC Products and Services. Brochure. FANUC America Corporation. 2017. Retrieved Jan. 24, 2019 from https://www.fanucamerica.com/docs/default-source/cnc-files/brochures/cnc-products-and-services.pdf?sfvrsn=865fc162_4.
Sakakibara, A two-armed intelligent robot assembles mini robots automatically. Industrial Electronics, Control, and Instrumentation. Proceedings of the 1996 IEEE IECON 22nd International Conference on Taipaei, Taiwan. 1996;3(5):1879-1883.
Schafer et al., Light-Weight Mechatronics and Sensorics for Robotic Exploration: a DLR Perspective. Feb. 25, 2008. Retrived from http://elib.dlr.de/55362/1/i-sairas2008_Schafer.pdf on Mar. 24, 2017.

* cited by examiner

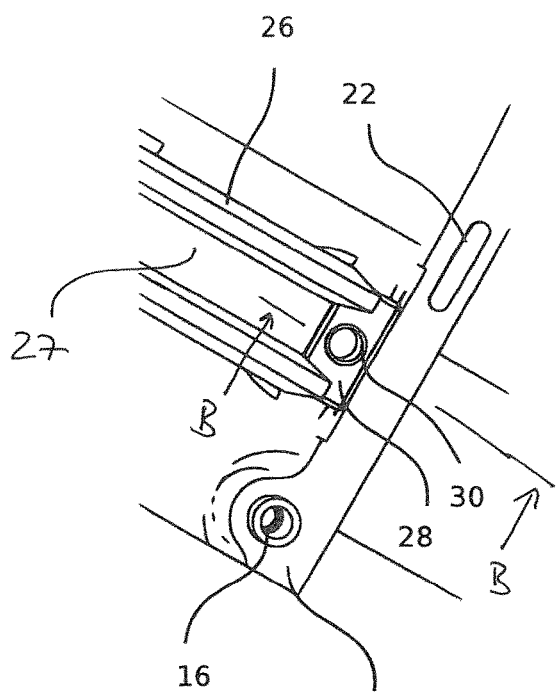
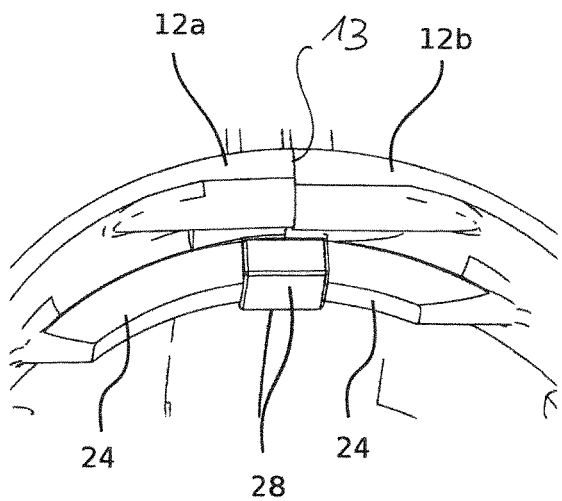
Fig. 4    Fig. 5
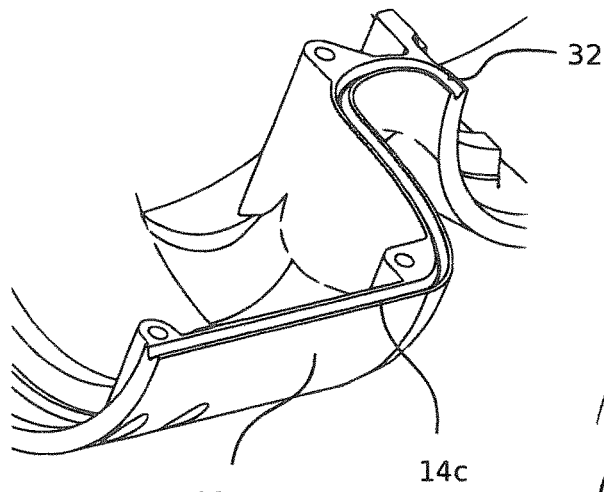
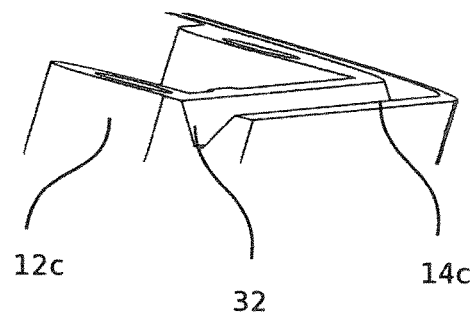
Fig. 7    Fig. 8

ROBOTIC SYSTEM AND HOUSING PART FOR SUCH ROBOTIC SYSTEM

RELATED APPLICATIONS

This application is a national stage filing under 35 U.S.C. § 371 of International Patent Application Serial No. PCT/EP2016/069339, filed Aug. 15, 2016, which claims priority to German application serial number DE 10 2015 012 960.0, filed Oct. 8, 2015 and to German application serial number DE 10 2015 113 483.7, filed Aug. 14, 2015. The entire contents of these applications are incorporated herein by reference in their entirety.

The invention relates to a robotic system and furthermore to a housing part and robot housing segment, respectively, which shall be used in connection with a robot arm or manipulator for such a robotic system.

Robotic systems having different mechanical configurations are able to reach with their miscellaneous effectors a defined position and orientation, respectively, within their environments or to move along defined trajectories in a three-dimensional space. For that purpose robot arms or manipulators are employed for guiding the effectors, which robot arms are composed of a plurality of arm elements, limbs or members, which are connected with each other by means of motion axes and joints, respectively, so that thereby a plurality of degrees of freedom is realized. Furthermore, for that purpose driving units are provided in the area of the joints between members being adjacent to each other, mainly electro- or hydraulic motors together with, where appropriate, gear mechanisms, so as to enable rotatory and/or translational relative movements between adjacent members, such as rotations around a longitudinal axis (rolling joint) or around a traverse axis (knee joint).

In general, as housing parts for robot arms two different configurations come into question, namely skeletal segments or tube segments. With respect to skeletal segments a skeleton-type support/carrying structure, e.g. in the form of a lever, is provided inside, which transmits all occurring forces and torques. The support structure may be encased by an outer housing to protect the signal and power supply lines. This configuration, however, is relatively easy to mount, but proves to be heavy since the torque-transmitting components comprise a small geometrical moment of inertia. Further, the protection of the signal and power supply lines is limited by the durability and stability of the outer housing.

In an alternative configuration, in which the housing parts for the robot arm are formed as one-piece-type, radially completely closed tube segments, the outer tube exclusively transmits the forces and torques, in which the signal and power supply lines can be guided in the tube interiors in a protective way. This configuration has advantages with respect to weight, since the material/wall thickness can be made smaller thereby still allowing the same requirements as regards rigidity. However, such design with tube segments is accompanied by the disadvantage that the assembly of the entire robotic system is relatively complex, since the signal and power supply lines have to be mounted and fixed inside of the tube and the flange-mounting of the driving units can be only performed within a correspondingly restricted assembly space. For that purpose, a strict sequence during assembly and disassembly has to be followed. The spatial narrowness in the tube bodies hinders a simple assembly and disassembly of the components, by which in part also additional tools become necessary. Therefore, also an automated process during manufacturing of such robotic system is hardly to be achieved.

Moreover, a further problem associated with such one-piece tube segments as housing parts is that maintenance/repair works and perhaps fault finding becomes elaborate and difficult, since the interior of the tube segments just becomes accessible when the single members, if necessary again sequentially, have been dismounted, in order to expose all mechanic, mechatronic and/or electronic components. Although, in the prior art, such problem is encountered to a certain extent in that single tube segments in the area of two joint positions or at the joint position directly are provided with detachable housing covers, which allow a more easy access to the interior, however, such covers are not aimed for transmitting forces and/or torques. Accordingly, the remaining segment and housing body, respectively, has to be configured more elaborate with respect to shape and strength.

Considering that it is an objective of the invention to avoid the afore-mentioned disadvantages and to provide a robotic system which is characterized by a simple way of assembly and at the same time by a minimal weight and by a better force and torque transmitting ability.

Such objective is solved by a robotic system on the one hand and by a housing part for a robot arm or manipulator on the other.

The invention relates to a robotic system having at least one robot arm which consists of a plurality of members or limbs, which are connected with each other by joints and which each comprise a housing for the reception of mechanical, mechatronic and/or electronic components, in which the housing is configured to transmit the torques and forces, which are introduced into the member, onto a member being adjacent thereto, and in which the housing is composed of at least two housing parts being complementary in shape, which housing parts are connected to each other in a manner allowing the transmission of torques and forces.

The at least two housing parts are preferably made as shell-like bodies, for example casted, and thereby enable an easy access to the interior of the member during assembly or maintenance works. Pre-mounted assembly modules, in particular joint units, can be simply inserted into an open shell part or can be separately assembled and tested in such open shell part at first. Wires can be easily placed in the shell-type housing part as well as sensors, electronic PCBs etc. can be mounted at positions provided for that, without that further components of the mechanism or the housing as such would hamper the accessibility.

If all components are mounted inside the first housing part, the member will be closed by the second housing part, in which according to the invention both housing parts are configured and positioned such that, after assembly, these are able to transmit forces and torques between each other and thereby also onto the respective adjacent member of the robot arm.

According to the invention the separation and connecting line, respectively, between the housing parts preferably runs substantially along the axial extensions of the member.

The transmission of the torques and the forces between the housing parts is realized according to the invention either in a load-carrying manner by surface contact and/or by means of form-fit and interlocking elements, respectively.

Several connecting elements are utilized for fixing the housing parts together, which are configured such that these allow a detachable connection between the housing parts at any time on the one hand and which take into account the mechanical and kinematic requirements of the robot arm on the other.

According to a preferred embodiment of the invention it is provided that at least one of said connecting elements is configured in such a way and arranged inside a housing part such that the torques and forces, which are introduced into the member by means of the driving units, are transmitted into and onto the housing of the member, respectively. In other words, that connecting element, which together with other connecting elements serves to fix both housing parts which each other, in addition provides the function to introduce torques and forces into the housing parts, which then are assembled together.

For example, the housing of the member may comprise at least at one of its ends a fixation element for fixing a driving unit, by means of which driving unit the member is connected to a member being adjacent thereto or to a further component of the robotic system in a manner so as to be moveable relative to each other, in which the fixation element is encased and enclosed by both housing parts.

In particular thereby the fixation element shall cooperate with at least one connecting element in the housing of the member in such a way that the fixation element can be fixed and mounted in the housing in a torque- and force-transmitting manner by means of said connecting element itself.

I.e., according to the invention, a torque- and force-transmitting connection between the fixation element for the driving unit, which is then being enclosed by the housing parts, and the housing structure shall be enabled when the housing parts are put together and connected by means of such connecting elements thereby forming such housing structure for the member.

Therefore, at least one of the preferably shell-like housing parts comprises at least one bearing/support element, which is arranged inside of and in the area of one end of the housing part and which cooperates with the fixation element in such a way that said fixation element is uniquely positioned both with respect to the radial and the axial direction and that it can be fixed in this position within the housing part.

According to a preferred embodiment the fixation element is made as a flange ring, in which according to the invention it then may be provided that the support element(s) come(s) into engagement with corresponding recesses or openings which are formed in the area of the radial circumferential surface of the flange ring.

According to an advantageous configuration recesses are provided between the support elements circumferentially in sections, which recesses enable a better ventilation of the housing for the purpose of heat dissipation. The bearing/support elements may over their circumference be formed as grooves, channels or walls and in particular may comprise a trapezoidal cross-section and inclined sides and flanks, respectively. In a corresponding way the flange ring may be provided with a complementary shape in the area of its radial circumference, at least with respect to the recesses being correspondingly provided for the support elements. Preferably, however, the flange ring is provided with a circumferential radial groove which is able to receive the support elements circumferentially in a load-carrying and/or form-fit/interlocking manner. Such connection is formed between the flange ring and the support elements so that then the transmission of forces and/or torques from the driving units into the housing parts can be achieved, which housing parts are connected to the driving units.

Support elements being configured in such a way, which support elements do engage in a radially surrounding groove of the flange ring, show the advantage that any shifting or tilting of the driving units during the assembly or during later operation will be prevented. For that purpose the angle of the inclined flanks is directed towards the radial direction preferably by 20 to 60 degrees. The wall-type support elements and the housing parts can be manufactured preferably from cast aluminum. In this connection cast material is less ductile when compared e.g. with aluminum bars, from which e.g. the flange rings for the driving units can be made. Thereby it is achieved that radial forces would more likely lead to an axial expansion of the flange legs rather than to a radial deformation of the inner flange, which speaks for greater tolerances during the manufacturing.

Also, a radial engagement is preferred with respect to the at least one connecting element, which also serves to connect the flange ring with at least one housing part in a torque- and force-transmitting manner.

In a preferred way such connecting element is formed as some kind of insert block which is arranged integrally at the housing part. The joining housing parts then can be connected by means of at least one insert block. This is advantageous in that a transmission of the torque can be mainly achieved also via the insert block, beside via the supporting surfaces between the flange ring and the housing parts.

According to a preferred configuration the connecting surfaces of adjacent housing parts are formed in the shape of tongue-groove-mechanisms. Such configuration leads to an increased rigidity of the components to be connected together; moreover no separating gap remains between the housing parts and manufacturing tolerances can be compensated in an easy way. Furthermore, thereby electro-magnetic interferences can be largely blocked and an optimum protection of the inside arranged components against the intrusion of dust, dirt and moisture is realized.

The tongue-groove-like connecting surfaces each may comprise a rectangular, trapezoidal or V-formed cross-section. Alternatively or in addition the connecting surfaces of adjacent housing parts comprise pin- and/or web-like connections fitting with each other. Both configurations do increase the rigidity of the housing and facilitate the assembly.

According to an alternative, preferred configuration both shell-type housing parts are bolted together. For this embodiment even connecting surfaces of the shell components are provided with holes for receiving insertable connecting elements. Even connecting surfaces can be easily milled, which particularly is of advantage in connection with spatially complex housing parts, such as shell components, in which the separating lines do not run straight and in one common plane, respectively.

Thereby the bolting can be achieved by the insertion of feather sleeves or feather keys into holes being provided in the housing structure for that purpose, in which a screw can be guided through the feather sleeve by means of which screw the housing part can be bolted together.

Alternatively it is also possible to form connecting surfaces of adjacent shell parts in a tongue-groove like manner and to connect them in addition by means of bolts, in order to realize particularly stable connections for the transmissions of the torques and the forces. Also it is possible to realize screw connections in that in one shell part inner bores are provided into which inner bores screws are screwed which screws are passing the adjacent shell part.

Inasmuch as the members of the robot arm are simple in that at least axial sections are formed substantially in a rotational symmetric way, only two form-complementary shell parts are sufficient, which enables an easy assembly. For more complex member structures the utilization of three or even several shell-type housing parts is possible.

The invention as described can be applied to single or all members of a robot arm or manipulator, in which the robot arm can be part of a more complex robotic system, such as a mobile platform with an arm or such as a humanoid. Basically, however not exclusively, the invention is directed to robotic systems having a structure of the light-weight type.

As material for the shell-type housing parts cast components from metal, such as aluminum, plastics or carbon can be used, in which the rigidity can be increased by appropriately selecting the wall thickness of the housing parts depending on the operation purpose of the robotic system. Moreover, the design of a housing segment also may be suited for leg, knee or similar limb connections and may for example be utilized also in the field of robotic-supported prosthetics.

It becomes apparent that the configuration of the housing structure for a member of a robot arm according to the invention thus enables a more quick assembly and maintenance due to the more easy accessibility to all inner components of a member, which reduces the manufacturing and operating costs for a robotic system containing such robot arm. Moreover, by a multi-part configuration of the housing of the members the latter can be better adapted to the geometric circumstances, which result from the inner components and from the intended motion trajectories of the robotic system, in which always a sufficient rigidity for the purpose of transmission of torques and forces is guaranteed.

Further advantages, features and characteristics become apparent from the following description of the embodiments as shown in connection with the accompanying drawings, in which FIG. 1 is a perspective view of a robotic system with a robot arm, which comprises a plurality of members;

FIG. 4 is a first perspective detailed view of the housing part;

FIG. 5 is a second perspective detailed view of the housing part;

FIG. 7 is a perspective detailed view of another embodiment of a housing part; and FIG. 8 is a perspective detailed view of the embodiment according to FIG. 7.

Figure 1:
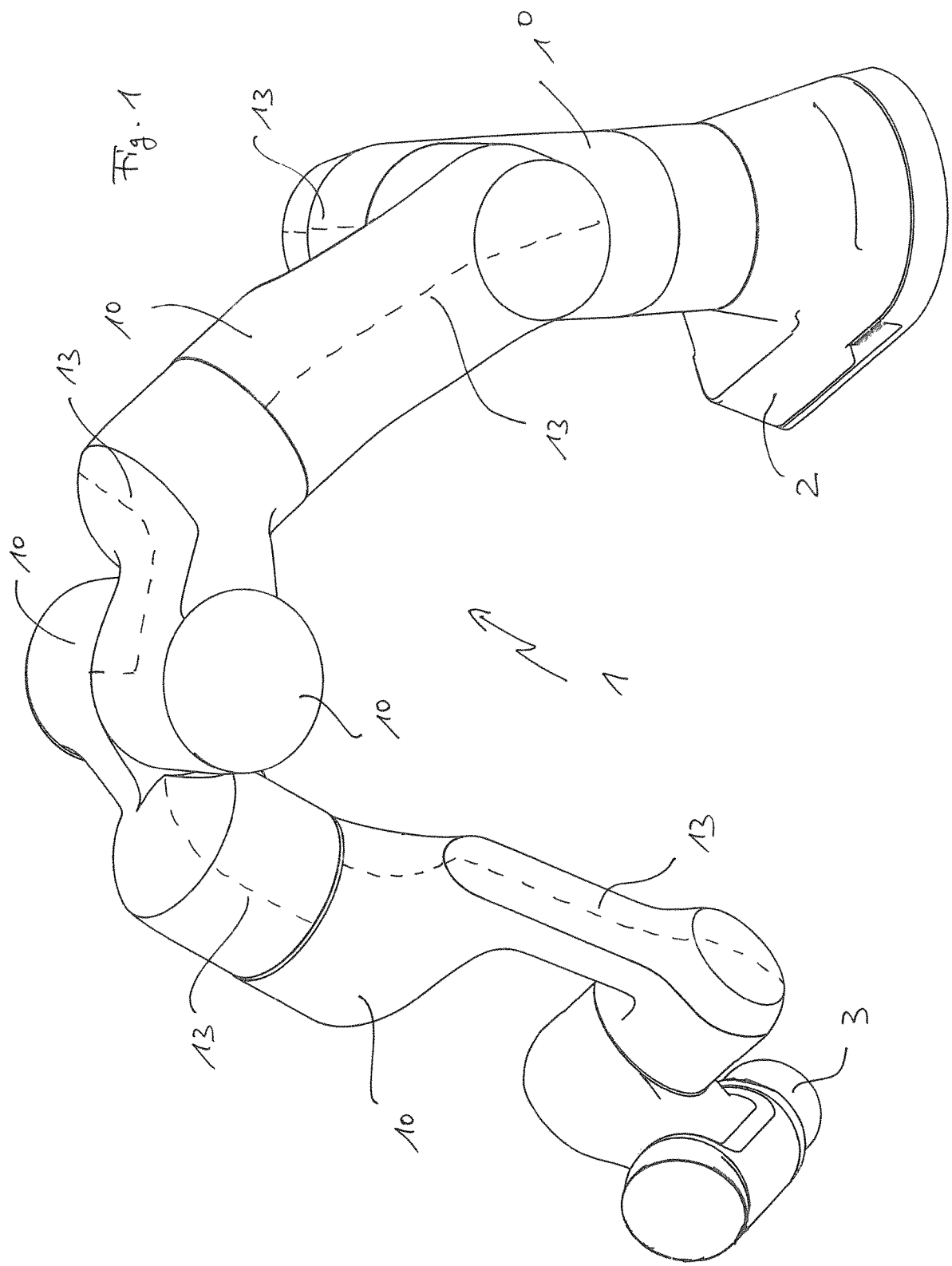

As an example, in FIG. 1 a robotic system 1 according to the invention is shown, which preferably is a robotic system of the light-weight type.

The robotic system 1 comprises a robot arm which is composed of several arm segments or members 10 which are connected to each other in a hinged way. Between a base 2 and an end effector 3 altogether six members 10 are connected by means of corresponding joint mechanisms, which comprise driving units, in order to enable a guidance of the end effector 3 in space by means of the transmission of rotatory and/or translational forces, in the present case under the provision of seven degrees of freedom.

According to the invention the housings of the members 10 are connected by two half-shell-type housing parts 12a and 12b, which are configured in a form-complementary manner, so that these are in contact with each other by connecting surfaces 14a, 14b.

The connecting surfaces 14a, 14b, which are preferably even, thereby are arranged in the area of connecting and separating lines 13, respectively, which substantially run along the axial extensions of the single members 10, as can be seen from FIG. 1, which for example shows the connecting lines 13 in dotted lines.

Figure 2:
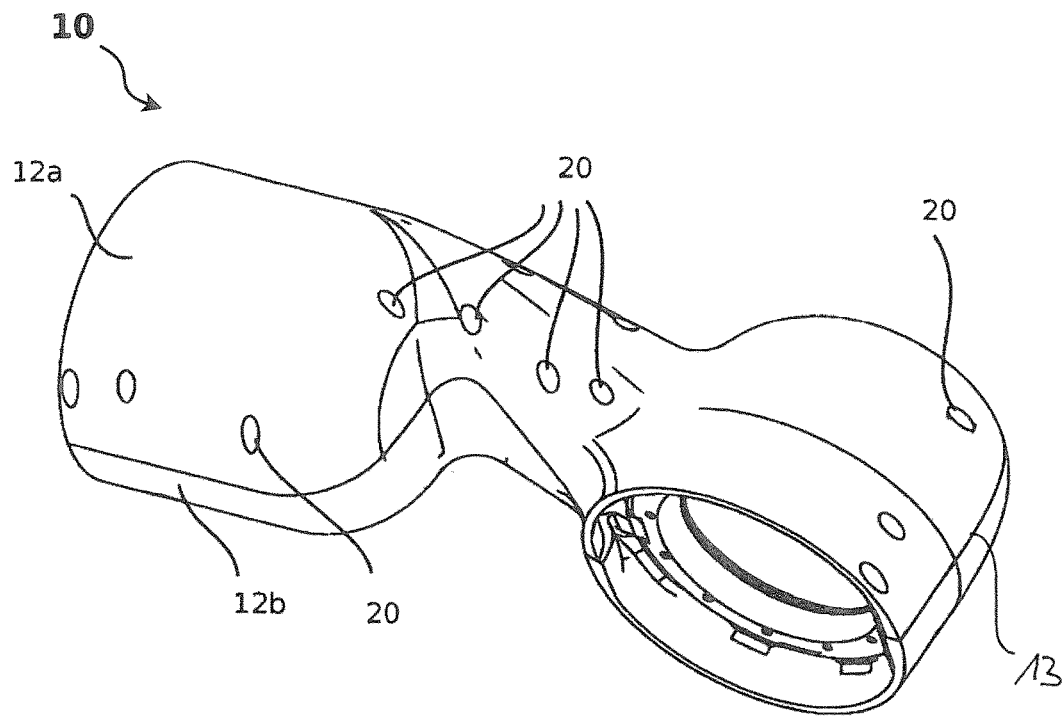
FIG. 2 is a perspective view of an assembled housing of a member, which is utilized in connection with a robot arm.

In the assembled state, as shown in FIG. 2, both housing parts 12a and 12b form a closed tube-like housing. Depending on the configuration and the operation purpose of the robotic system the housing parts 12a and 12b may be made from different material, however, for the purpose of rigidity are preferably made from aluminum.

Both housing parts 12a and 12b are connected with each other by means of a plurality of connecting elements in a detachable way, in which the connecting elements can differ depending to their functionality.

Figure 3:
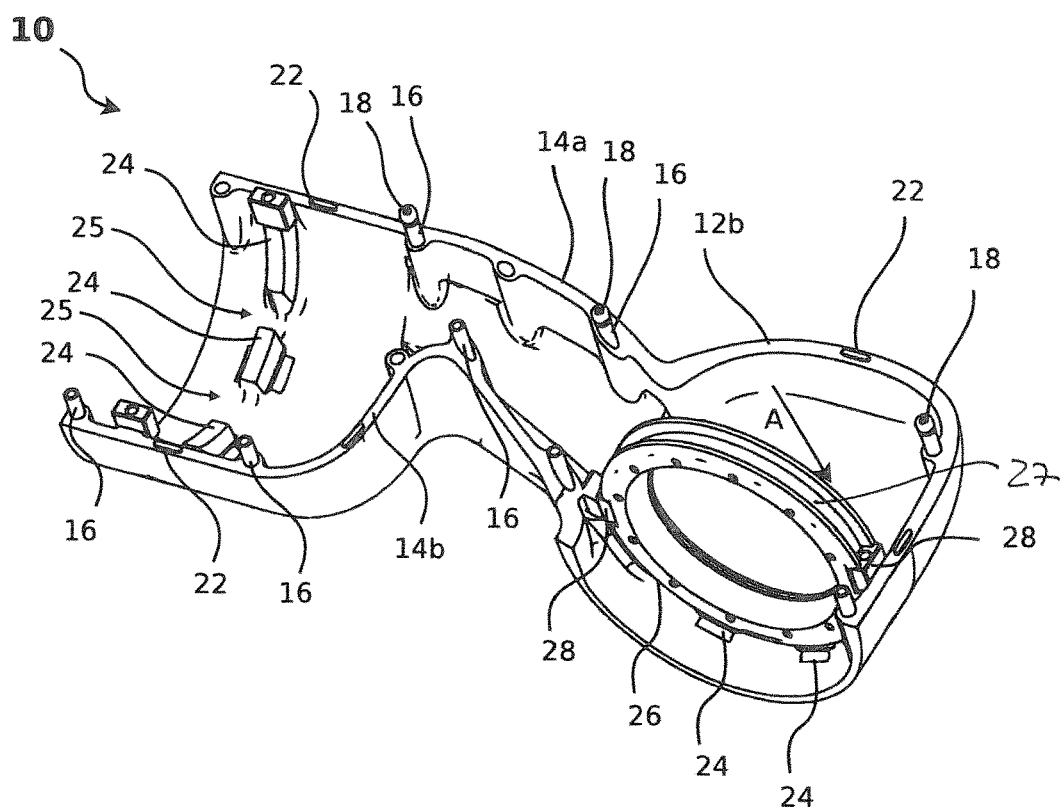
FIG. 3 is a perspective view of a shell-type housing part according to the invention.

FIG. 3 shows an open housing part 12b.

A certain number of feather sleeves 16 are inserted into corresponding bores of the cast body of said housing part 12b, which each comprise an inner thread for the reception of connecting screws 18, which are inserted and thereby passing corresponding bores 20 in the other shell part 12a and are easily accessible for an assembly tool.

In order to realize a better positioning of both housing parts 12, 12b, which housing parts shall be connected along the connecting surfaces 14a,14b, longitudinal protrusions 22 are formed in sections in the connecting surfaces 14a,14b of the housing part 12b, which in the assembled state of the housing do engage with corresponding, not shown recesses. By that the rigidity of the tube body being formed from both housing parts 12a, 12b is increased, as well as a relative movement between the housing parts during the assembly in relation to each other is prevented.

According to the invention bearing/support elements 24 are provided at or on the inner surface of both housing parts 12a and 12b, which serve for the reception of a flange ring 26.

The flange ring 26 in turn serves for the fixation of a not-shown driving unit, by means of which driving unit the member 10 can be moved relative to another member 12 being adjacent thereto or relative to a further component of the robotic system.

The driving unit introduces rotatory and/or translational forces into the member 10, which will be then transmitted from the member 10 to the adjacent member 10. The torques and forces being generated thereby thus have to be transmitted from the driving unit into the housing of the member 10 as well.

Recesses 25 are provided between radially, in sections surrounding support elements 24, by which an enhanced ventilation of the housing is enabled. Alternatively it is also possible to provide a continuous, radially surrounding support element 24.

The housing part 12b as shown in FIG. 3 comprises such support elements 24 at both of its ends, in which no flange ring 26 is shown to the left of FIG. 3 for clarity reasons.

According to the invention, the housing part 12b close to the connecting surfaces 14a, 14b comprises two connecting elements in the form of insert blocks 28, which face each other and which are formed integrally with the body of the housing part 12b.

FIG. 4 shows an enlarged view of the flange ring 26 and one insert block 28 in a direction as shown in FIG. 3 by A. FIG. 5 shows a perspective inner view of the support elements 24 with the insert block 28 and both housing parts 12a, 12b, however, without the flange ring 26. In the assembled state of the housing of the member 10, as shown in FIG. 5, the insert block overlaps the connecting and separating line 13, respectively, between both housing parts 12a and 12b.

Figure 6:
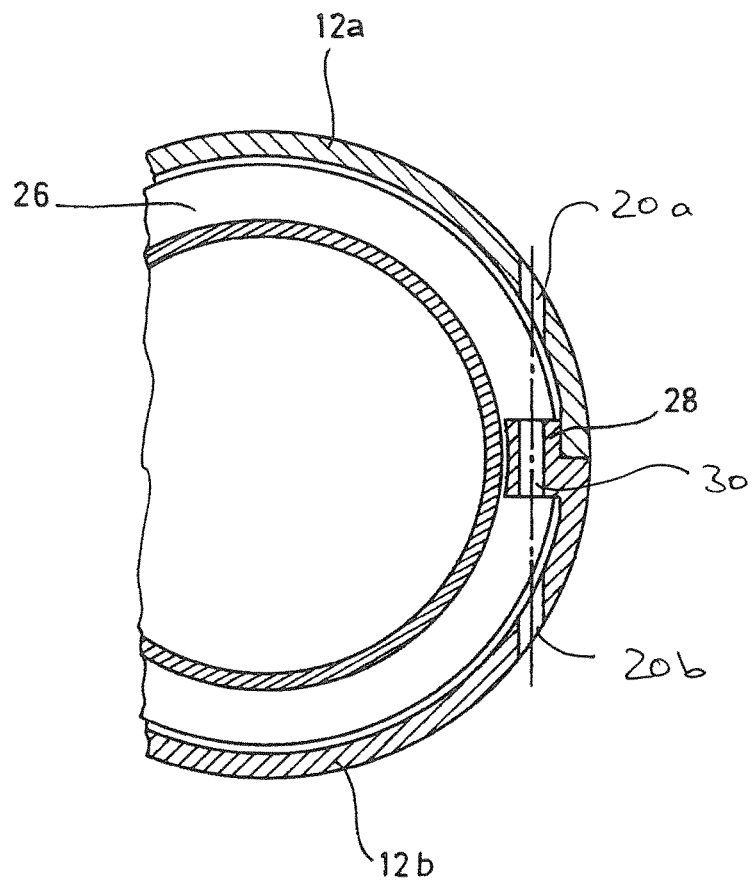
FIG. 6 is a cross-section along B-B of FIG. 4.

In FIG. 6 a preferred embodiment according to the invention is shown in a detailed cross-section along B-B from FIG. 4.

The insert block 28 comprises a through hole 30, which may comprise a corresponding inner thread (not shown), so that the insert block 28 can be passed from both sides by a fixation screw (not shown), respectively, for the purpose of connecting and fixing of both housing parts 12a and 12b, in which the fixation screw is guided by the corresponding bores 20a and 20b in the housing.

According to a preferred embodiment both housing parts 12a and 12b may be connected by means of two pairs of screws only, which cooperate with the insert block 28, namely with two screws from opposite sides, respectively. Alternatively the insert block 28 may comprise a through hole 30 without having a thread so that a screw connecting both housing parts 12a and 12b is simply passing through it and which screw then engages into the inner threads of the bores 20a and 20b, respectively.

In both cases a rigid fixation of both housing parts 12a and 12b is mainly realized by means of the connecting screws, which engage into the through bore 30 (with or without inner thread) and thereby push the support elements 24 against the flange ring 26 or into a surrounding radial groove 27 by pressing the housing parts 12a, 12b together. For that purpose the circumferential groove or channel 27 of the flange ring 26 comprises a trapezoidal cross-section and the support elements comprise corresponding inclined connecting surfaces, by which during assembly and fixation of the housing parts 12a and 12b a load-carrying connection is formed between the flange ring 26 and the support elements 24, which is further supported by the insert blocks 28 in a form-complementary way.

In this embodiment of the invention thus a load-carrying connection between the flange ring 26 and the support elements is not realized before the housing parts 12a and 12b are fixed together by way of assembly, which connection supports the transmission of torques and forces being introduced into the member 10.

The insert block 28 thereby engages into a corresponding radial recess in the flange ring 26, as shown in FIG. 4.

In FIGS. 7 and 8 a second embodiment according to the invention is shown, which differs from the embodiment as shown by FIGS. 2 to 6 in that the connecting edge 14c of the housing part 12c comprises a continuous V-shaped groove 32. For that purpose a not-shown, complementary second shell-type housing part comprises a complementary V-shaped wall, which together with the groove enables a substantially stiffer connection of both shell-formed housing parts.

The invention claimed is:

1. A housing part for a housing of a member for a robot arm of a robotic system, the housing part comprising:
   a plurality of connecting elements for connection with at least a further housing part in a detachable manner thereby forming said housing of said member,
   wherein a connecting surface of said housing part is configured to contact the further housing part along a connecting surface of the further housing part, and wherein at least one of the plurality of connecting elements is configured to allow a torque-and-force-transmitting connection between said housing parts,
   wherein at least one of the plurality of connecting elements is configured to directly cooperate with a fixation element for the fixation of a driving unit in such a way that the fixation element is configured to be fixed and mounted in the housing in a torque-and-force-transmitting manner by at least one of the plurality of connecting elements itself.

2. The housing part of claim 1, in which the at least one of the plurality of connecting elements is formed integrally with the housing part.

3. The housing part of claim 1, in which the connecting surface for the further housing part comprises at least in sections groove elements.

4. The housing part of claim 1, in which the housing part has a shell-like structure and comprises at least one support element, which is arranged inside and in the area of one end of the housing part and which is configured to cooperate with the fixation element in an interlocking and/or load-carrying manner.

5. The housing part of claim 4, in which the support element cooperates with the fixation element in such a way that said fixation element is uniquely positioned both with respect to a radial direction and an axial direction.

6. The housing part of claim 5, in which several support elements are circumferentially arranged in sections, forming recesses therebetween.

7. The housing part of claim 5, in which the support element is integral with the housing part.

8. The housing part of claim 7, in which the support element is formed as a wall element having a trapezoidal cross-section.

9. A member of a robot arm of a robotic system, the member comprising a housing for the reception of mechanical, mechatronic and/or electronic components, the housing comprising at least two housing parts according to claim 1.

10. The member of claim 9, in which the at least two housing parts are configured to encase a fixation element in the form of a flange ring.

11. A robotic system having at least one robot arm which comprises a plurality of members according to claim 9.

* * * * *